2,942,017
ORGANOZINC SULFATE AND SULFONATE COMPOUNDS

Harris E. Petree, Baton Rouge, La., assignor to Ethyl Corporation, New York, N.Y., a corporation of Delaware No Drawing. Filed July 30, 1958, Ser. No. 751,892

8 Claims. (Cl. 260—429.9)

The present invention relates to organozinc sulfate and sulfonate compounds and a process for their manufacture.

As far as now known, no organozinc sulfate compound wherein a carbon atom of an organo radical is attached to zinc and the zinc is in turn only attached to an oxygen atom of the sulfate ion have been prepared. Similarly, only recently has a method for organozinc organo sulfate or sulfonate compounds been available. Such compounds are desirable as a new source of alkylating agent. That is, they can be employed in order to utilize the organo radical of the compound in formation of another compound, for example another organometallic. Although a number of organozinc compounds are known such have been prepared by methods which are costly and tedious so that they are available only for laboratory purposes. The processes are not of sufficient economy and practicality to merit commercial production. For example, alkylzinc halides are prepared by reacting an alkyl halide with zinc dust. The procedure can be adjusted to result in the formation of the dialkyl zinc compound.

Accordingly, an object of this invention is to provide novel organozinc compounds and a process for their manufacture. Another object is to provide more economical and useful organozinc compounds by a more efficient and economical process. A particular object is to provide novel organozinc sulfate compounds. These and other objects will be evident as the discussion proceeds.

The above and other objects of this invention are accomplished by the reaction of an organic ester of sulfuric acid or an organic sulfonic acid with zinc in the presence of a catalyst selected from the group consisting of organozinc halides and organo halides. The process is generally conducted at a temperature between about 50 to 250° C. The alkyl sulfates and sulfonates in which the alkyl groups contain up to and including about 6 carbon atoms are particularly preferred as are the catalysts in which the organo radical is a similar alkyl group. The iodides and bromides are particularly preferred alkyl halide and alkyl zinc halide catalysts. The novel products produced according to the process are the bis-organozinc sulfates. That is, compounds in which both hydrogen atoms of sulfuric acid are replaced by an organozinc radical and the carbon atom of the organo radical is linked to zinc which in turn is linked to an oxygen atom of the sulfate anion. The bis-hydrocarbon zinc sulfates are preferred compositions particularly those in which the hydrocarbon groups are alkyl having up to and including about 6 carbon atoms.

The present invention provides certain novel organozinc sulfate compounds which have not been heretofore available. Such compounds are more economical and useful than the previously known organozinc compounds. They are characterized by high stability and greater reactivity providing a new source of alkylating agents. The process by which they and other organozinc sulfate and sulfonate compounds are prepared is likewise advantageous in that economies are effected resulting in a cheaper source of organozinc compounds and likewise the products are produced in high yield and purity. Other advantages will be evident as the discussion proceeds.

The novel compounds of this invention comprise the bis-organozinc sulfate compounds. The organo radicals in such compounds can be both aliphatic and aromatic. The compounds can be depicted by the following general formula:

$$(RZn)_2SO_4$$

wherein R is an organo radical containing up to about 30 carbon atoms and higher. Typical examples of the novel compositions comprise bis-methylzinc sulfate, bis-ethylzinc sulfate, bis-pentylzinc sulfate, bis-hexylzinc sulfate, bis-decylzinc sulfate, bis-octadecylzinc sulfate, bis-eicosylzinc sulfate, bis-tricosylzinc sulfate, bis-isopropylzinc sulfate, bis-isobutylzinc sulfate, bis-isooctylzinc sulfate, and the like alkyl zinc sulfate compounds, bis-vinylzinc sulfate, bis-α-octylvinylzinc sulfate, bis-2-hexenylzinc sulfate, bis-4-octadecenylzinc sulfate, and the like alkenyl zinc sulfate compounds; bis-cyclobutylzinc sulfate, bis-cyclohexylzinc sulfate, bis-cycloheptylzinc sulfate, bis-cyclohexenylzinc sulfate, and the like cycloaliphatic zinc sulfates; bis-ethynylzinc sulfate, bis-1-hexynylzinc sulfate, bis-3-hexynylzinc sulfate, and the like acetylenic zinc sulfate compounds; bis-phenylzinc sulfate, bis-p-tolylzinc sulfate, bis-benzylzinc sulfate, bis-naphthylzinc sulfate, bis-xylylzinc sulfate, bis-anthracylzinc sulfate, and the like aromatic zinc sulfates and mixed organozinc sulfates as, for example, methylzinc-ethylzinc sulfate, ethylzinc-hexylzinc sulfate, ethylzinc-phenylzinc sulfate, and the like. The hydrocarbon radicals contained in the above-mentioned zinc sulfate compounds can be further substituted to result in additional branch chain compounds and compounds containing other functional groups. The hydrocarbon zinc sulfates comprise preferred organozinc sulfate compositions because of their greater utility, stability and chemical characteristics. Such hydrocarbon zinc sulfates in which the hydrocarbon groups comprise only alkyl groups containing up to and including about 6 carbon atoms are especially preferred because of their greater reactivity and ease of handling.

Depending upon the specific conditions under which the reaction is conducted, as will be brought forth more fully hereinafter, organozinc organosulfate compounds will be co-produced or solely produced which are distinct from the above compounds but have the configuration of zinc metal attached to a carbon atom of the organo radical and additionally attached to an oxygen atom of the sulfate anion and another oxygen atom of the sulfate anion is linked to an organo radical through carbon. These products can be depicted by the following formula:

$$RZnO-SO_2-OR'$$

wherein R and R' can be the same or different and have the meaning described previously in connection with the R groups of the novel compounds of this invention. Thus, typical of such products are methylzinc methylsulfate, ethylzinc ethylsulfate, vinylzinc vinylsulfate, phenylzinc phenylsulfate, benzylzinc benzylsulfate, cyclohexylzinc cyclohexylsulfate, ethylzinc methylsulfate, and the like.

Among the organozinc sulfonate compounds, which are produced according to the process of this invention, are included for example, ethylzinc p-toluenesulfonate, octylzinc benzenesulfonate, vinylzinc methanesulfonate, cyclohexylzinc ethanesulfonate, ethylzinc ethanesulfonate, phenylzinc benzenesulfonate, and the like sulfonate compounds.

The above products are prepared by the novel process which comprises reacting an organic ester of sulfuric or an organo sulfonic acid with zinc metal in the presence of a catalyst selected from the group consisting of organozinc halides and organic halides.

In general, the process is conducted at a temperature between about 50 to 250° C. In order to obtain the highest yield of the bis-organosulfate compounds, it is preferred to operate at a temperature between 115 to 160° C. in a closed reactor to maintain the volatile alkyl halide within the reaction mixture at all times. If the temperature is decreased below 115° C. the yield of bis-organozinc sulfate compound is correspondingly diminished. Temperatures above 160° C. are less desirable in that secondary reactions may take place, decomposition may occur and no particular advantage in reaction rate and yield is observed. In order to obtain the organozinc organosulfate compounds in highest yield, it is preferred to operate at a temperature between about 65 to 105° C. Lower temperatures are to be avoided since the yield of organozinc organosulfate will likewise be reduced. It is evident that at temperatures between about 105 to 115° C., a mixture of the bis-organozinc sulfate and organozinc organosulfate compounds is obtained since the former product is produced from the latter in the system. Such mixtures are also useful but are less desirable because of the basic differences between the two classes of compounds. When employing an organic ester of an organo sulfonic acid, it is preferable to conduct the reaction at temperatures between about 75 to 125° C.

The organo sulfate or sulfonate, as the case may be, which is employed is an ester of sulfuric acid or organo sulfonic acid in which the hydrogen atoms have been substituted by organo radicals. Such esters can be depicted by the following formulae:

and

wherein R and R' can be the same or different and have the meaning described above. Typical examples of such esters include dimethyl sulfate, diethyl sulfate, dihexyl sulfate, dieicosyl sulfate, ethyl methyl sulfate, ethyl hexyl sulfate, divinyl sulfate, diethynyl sulfate, diphenyl sulfate, dibenzyl sulfate, dinaphthyl sulfate, dicyclohexyl sulfate, ethyl ethanesulfonate, octyl ethanesulfonate, hexyl p-toluenesulfonate, vinyl benzenesulfonate, phenyl benzenesulfonate, and the like. The organo portion of such sulfates and sulfonates can be further substituted provided such substituents are non-reactive. However, in general, the hydrocarbon sulfates and sulfonates particularly hydrocarbon alkyl sulfates and sulfonates having up to and including about 6 carbon atoms in each alkyl group are preferred because of their greater availability, economy, and applicability to the process. The sulfates are preferred over the sulfonates because of the better results obtained. Diethyl sulfate is an especially preferred embodiment.

The zinc employed in the reaction can be in any form, that is as large pieces in any configuration, as the commercial mossy zinc or as finely divided powder. It likewise can be alloyed with other metals which are inert and do not hinder the reaction, as for example copper, chromium, and the like. It is preferred to employ the zinc in finely divided form, e.g., less than about ⅛″ major dimension and preferably below 1000 microns in size. A particularly preferred size is between 50 to 1000 microns.

The catalysts employed in the process of this invention are the organozinc halides and organohalides. In general, any organozinc halide having the formula RZnX as well as any organo halide having the formula RX can be employed wherein the R's are organic radicals as described previously and the X's are halogen. Among organozinc halides employable are included, for example, methylzinc iodide, ethylzinc bromide, pentylzinc chloride, hexylzinc iodide, decylzinc bromide, octadecylzinc chloride, eicosylzinc iodide, tricosylzinc iodide, vinylzinc iodide, cyclohexylzinc chloride, phenylzinc bromide, tolylzinc chloride, and the like. The organo halides include, for example, methyl iodide, ethyl bromide, pentyl chloride, hexyl iodide, octadecyl chloride, eicosyl iodide, cyclohexyl bromide, vinyl chloride, phenyl iodide, benzyl bromide, and the like. In the aforementioned catalysts, it is to be understood that the organo radicals can be further substituted to result in branch chain compounds and compounds having other substitution as illustrated above provided such are essentially inert. It is preferred, however, to employ hydrocarbon halides or hydrocarbon zinc halides, particularly alkyl hydrocarbon compounds, wherein the alkyl groups contain up to and including about 6 carbon atoms. Such are more readily prepared and exhibit greater catalytic effect. The hydrocarbon zinc halides are especially preferred catalysts to be employed since such are produced as a by-product of the reaction regardless of which type catalyst is employed and are easier to handle, more stable and reactive. The halide of the catalyst can be any halide including chlorine, bromine, iodine and fluorine. Astatine would also work although such is not generally available and of poor stability. The preferred halides are bromide and iodine.

The amount of catalyst employed can be varied over a wide range. In general, some catalytic effect is exhibited when as little as 0.01 mole of the catalyst per mole of the zinc are employed. An excessive amount as, for example, 0.75 mole of the catalyst per mole of the zinc can be employed. In general, between about 0.05 to 0.2 mole of catalyst per mole of zinc are preferred since best results as far as yield and rate of reaction are obtained.

A by-product of the reaction is the formation of the organozinc halide described above as catalysts. This material is likewise useful as an alkylating agent and a portion thereof can be recycled as catalyst in the reaction or form a heel into which continuous addition of the organic sulfate and zinc metal can be added. A general procedure of the reaction is to add the organo sulfate or sulfonate, catalyst, and finely divided zinc to a reactor in the presence of a diluent, if desired, at the prescribed temperature. On completion of the reaction, the organozinc halide by-product may readily be extracted from the product, and excess zinc if present, and the product can be removed from the zinc by extraction, decantation, or filtration. Additional quantities of organo sulfate or sulfonate and zinc metal may be added to the reactor along with the recovered catalyst to continue the further production of the organozinc sulfates or sulfonates.

The process of this invention is further demonstrated by the following examples wherein all parts are by weight unless otherwise specified.

*Example I*

To a reactor equipped with internal agitation and external heating was added 14.4 parts of powdered zinc, 15.4 parts of diethyl sulfate, 1 part ethylzinc iodide and 3.8 parts of ethyl iodide in 20 parts of diethyl ether under a nitrogen flush. The reactor was then sealed. The temperature of the mixture was raised to 121° to 135° C. and maintained at this temperature for 5 hours and 15 minutes. The reaction mixture was then filtered with diethyl ether extraction. The solids were then extracted with hot tetrahydrofuran and then the tetrahydrofuran solution was subjected to vacuum distillation for its removal. The residue, a white solid, amounted to 23.7 parts which is very active and commences smoking in air. When hydrolyzed with dilute nitric acid a positive sulfate ion test is obtained. Analysis of the product showed zinc and sulfate content in amounts within experimental error of the theoretical amount for bis-ethylzinc sulfate tetrahydrofuran etherate (EtZn)$_2$SO$_4$.C$_4$H$_8$O. When a portion of this product was subjected to quantitative gas evolution by hydrolyzing with 3 normal hydrochloric acid, essentially the quantitative amount of gas was evolved.

Example II

When Example I is repeated employing only ethylzinc iodide as the catalyst, 4.8 parts, bis-ethylzinc sulfate is obtained in high yield. The recovered by-product ethylzinc iodide can be reused as catalyst.

Example III

Employing the procedure of Example I, 113 parts of dimethyl sulfate are reacted with 119 parts of zinc in the presence of 15 parts of methylzinc iodide for 3 hours at 145° C. Bis-methylzinc sulfate having the formula (CH$_3$Zn)$_2$SO$_4$ is obtained in high yield and purity.

Example IV

When 29 parts of di-n-hexyl sulfate are reacted with 13 parts of finely divided zinc in the presence of 3 parts of hexyl bromide at 125° C. for 2 hours, bis-n-hexylzinc sulfate is obtained in high yield.

Example V

Employing the procedure of Example I, 15 parts of divinyl sulfate are reacted with 12 parts of zinc in the presence of 2 parts of vinyl bromide at 150° C. for 1 hour. Bis-vinylzinc sulfate is obtained in high yield.

Example VI

To the reactor of Example I is added 25 parts of diphenyl sulfate, 12 parts of finely divided zinc and 3 parts phenyl iodide. Heating and maintaining the reactor at 250° C. and autogenous pressure for 5 hours results in a high yield of bis-phenylzinc sulfate and by-product phenylzinc iodide.

Example VII

Employing a portion of the by-product phenylzinc iodide of the preceding example, 2 parts, in admixture with 28 parts of dicyclohexyl sulfate and 13 parts of finely divided zinc, bis-cyclohexylzinc sulfate is produced when heated at 160° C. for 3 hours.

Example VIII

Dibenzyl sulfate is reacted with finely divided zinc employing benzylzinc chloride as a catalyst and mineral oil as a diluent at the reflux temperature for 2 hours. Bisbenzylzinc sulfate is obtained in high yield.

The following examples will demonstrate that embodiment of this invention wherein the conditions of operation are altered slightly to produce as the predominant product organozinc organosulfate compounds.

Example IX

To a reactor was added 119 grams of zinc powder and 139 parts of diethyl sulfate. Then 80 parts of trimethylhexane, 3.5 parts of diethyl ether and 10 parts of ethyl iodide were added and the mixture heated with agitation at 100 to 103° C. for 1½ hours. The mixture was then diluted with 80 parts of isooctane and filtered under nitrogen in a dry box. The solids were reslurried with 240 parts of isooctane and refiltered to remove traces of unreacted diethyl sulfate. The residual mixture was subjected to extraction with diethyl ether continuously to extract the product from the zinc. The extract was then concentrated by distillation of the ether solvent. The residue was then heated at 50° C. and less than 1 millimeter vacuum to remove all traces of solvent. In this manner, 190 parts of white solid product, representing a 96 percent yield, was obtained. Hydrolysis of the product with 3 normal hydrochloric acid resulted in a quantitative gas evolution verifying the formation of ethylzinc ethylsulfate. Elemental analysis showed 30.05 percent zinc in the product, whereas the calculated amount of zinc is 29.78 percent.

Example X

When Example IX is repeated with exception that the temperature is maintained at 75 to 85° C., ethylzinc ethylsulfate is obtained in high yield.

Example XI

Example III is repeated employing a reaction temperature of 55 to 60° C. for four hours. An essentially quantitative yield of methylzinc methylsulfate is obtained.

Similar results are obtained when Examples V through VIII are repeated employing temperatures of 50, 80, 70, and 85° C. respectively, to produce the corresponding organozinc organosulfate compounds.

The following examples will demonstrate the formation of organozinc organosulfonate compounds according to the process of this invention.

Example XII

Example I is repeated essentially as described with exception that ethyl p-toluenesulfonate is substituted for diethyl sulfate. Ethylzinc p-toluenesulfonate is obtained in high yield.

Example XIII

Again repeating Example I, the ethyl ester of ethanesulfonic acid is substituted for diethyl sulfate thereby producing ethylzinc ethanesulfonate in high yield.

Example XIV

Example IX is repeated substituting phenyl benzenesulfonate for diethyl sulfate. Phenylzinc benzenesulfonate is obtained in high yield.

Similar results are obtained when other esters of organo sulfonic acids are employed such as cyclohexyl ethanesulfonate, vinyl methanesulfonate, octyl p-toluene sulfonate, and the like.

The above examples are given by way of illustration and it is not intended that the invention be limited thereby. For example, when di-1-hexynyl sulfate, dinaphthyl sulfate, dicyclobutyl sulfate, methyl ethyl sulfate, dioctadecyl sulfate, and the like and amyl chloride, decyl bromide, hexyl fluoride, cyclohexyl iodide, p-tolyl bromide, cyclopropyl zinc iodide, butadienyl zinc fluoride and the like organo halides are substituted for the organo sulfate and organo halides in the above examples, the corresponding organozinc sulfate compounds are obtained.

The reaction is generally conducted under autogenous pressure to prevent loss of the catalyst from the reaction mixture. However, if desired, subatmospheric and super atmospheric pressures as up to as high as 150 atmospheres and higher can be used. Autogenous or super atmospheric pressure is advantageous when any of the constituents of the reaction mixture are volatile at the temperature employed. On the other hand, in these instances reflux conditions can also be employed which serves for better heat control, more intimate admixture and enhancement in reaction rate.

Although solvents are not required, such are generally employed when the sulfates, sulfonates, or organozinc halide compound is solid or insoluble in the reaction mixture. For such purposes, the usual organic solvents can be employed with the general criteria being that they be essentially inert in the reaction and liquid under reaction conditions. Included among such solvents are the hydrocarbons, preferably aliphatic, ethers and tertiary amines. Typical examples of such solvents include the aliphatic hydrocarbons as the hexanes, octanes, nonanes, octadecanes, cyclohexanes, and the like. Among the tertiary amines which can be employed are included the tertiary, alkyl, aryl and cyclic amines. Typical examples of such amines include methylpyridine, amyl diphenyl amine, p-isobutyl dimethyl aniline, triphenyl amine, tricyclohexyl amine, triethyl amine, trimethyl amine and the like. Included among such ethers are the aliphatic and the polyethers. The aliphatic ethers include the monoaliphatic and mixed ethers. Typical examples of the monoaliphatic ethers included are di-n-butyl ether, di-sec-butyl ether; diisobutyl ether, di-n-amyl ether; di-n-heptyl ether; tetrahydrofuran; and the like saturated and unsaturated ethers. Examples of the mixed ethers which are employed are n-amylmethyl ether; tert-amylethyl ether; n-butylisopropyl ether; ethylisoamyl ether; n-butyl-n-propyl ether and the like. Examples of the polyethers which are employed are those having the configuration R—O—$(CH_2)_n$—O—R wherein R is an organic radical, preferably aliphatic hydrocarbon or ether radical, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like.

The proportion of the metallic zinc to organo sulfate or sulfonate employed in the process of this invention can be varied over wide limits. In general, however, between about ½ mole to 3 moles of zinc per mole of organo sulfate or sulfonate are employed.

In order to obtain the bis-organozinc sulfates in highest yields, it is preferred to employ between 2 to 3 moles of zinc per mole of sulfate ester. For highest yields of organozinc organosulfate or sulfonate product between 0.75 to 1.5 moles of zinc per mole of sulfate or sulfonate ester is employed.

The novel bis-organozinc sulfate products are of considerable utility. They are especially useful as alkylating agents, that is, a source of organo radicals which can be used for the formation of other organometallic compounds. They are likewise useful as electrolytes for electrolysis using various metal anodes, e.g., lead, to result in a transfer of the organo radical to form a metal to carbon bond with the metal employed as an anode. Another use for the compounds of this invention is as a catalyst for the polymerization of olefins especially the terminal olefinic compounds. For example, when a minor proportion of bis-ethylzinc sulfate is employed by ball-milling with titanium tetrachloride to form a catalyst for polymerizing ethylene at 150° C. and 10,000 p.s.i., polyethylene having a softening point of about 130° C. is obtained. The organozinc organosulfate and organozinc organosulfonate compounds produced according to the process are also of considerable utility in the above uses.

The bis-organozinc sulfate compounds are particularly unique in that they are not as spontaneously flammable as are other previously known organozinc compounds including other organozinc sulfate and sulfonate compounds also produced by the process of this invention. They likewise are non-volatile and are not readily disproportionated so that they can be employed at higher temperatures. This characteristic makes them especially useful as agents for the removal of traces of oxygen from gas streams, e.g., nitrogen, because they will remove the oxygen readily without introducing volatile contaminants.

A particular advantageous use of the compositions of this invention is in the preparation of organolead compounds. The following example will demonstrate such use.

*Example XV*

To an autoclave is added 65 parts of lead diacetate, 60 parts of bis-ethylzinc sulfate and 200 parts of the dimethyl ether of diethylene glycol. The reaction mixture is heated to a temperature of 120° C. and maintained at this temperature for 1 hour. At the end of this period the reaction mixture is cooled to room temperature and water slowly added thereto. The water is decanted from the TEL layer.

The lead salts of organic acids are particularly preferred in the above use of the compounds of this invention because of the higher yields of organolead product obtained. In general, any lead salt of an organic acid including alcoholates and thioalcoholates which exhibit acid characteristics are employable although the lead salts of alkanoic acids having up to about 6 carbon atoms are generally most advantageous. Other lead compounds can also be employed including the halides, oxides, and sulfides, the oxides and sulfides being preferred over the lead halides.

The products of this invention are generally more stable than other organometallic compounds. However, they are susceptible to degradation when exposed to moist atmosphere. Accordingly, in all operations in which they are employed and in handling these materials, an inert atmosphere is generally used. For this purpose inert atmospheres, such as a vacuum, the rare gases including argon, neon, krypton, and nitrogen are used to prevent reactivity of the compound.

Having thus described the novel compounds and the novel process, it is not intended that the invention be limited except as set forth in the following claims.

I claim:
1. Compounds having the formula $(RZn)_2SO_4$ wherein R is a hydrocarbon radical.
2. Bis-ethylzinc sulfate.
3. The process which comprises reacting a compound selected from the group consisting of dihydrocarbon esters of sulfuric acid and a hydrocarbon ester of a hydrocarbon sulfonic acid with metallic zinc in the presence of and in contact with a catalyst selected from the group consisting of hydrocarbon zinc halides and hydrocarbon halides.
4. A process for the manufacture of bis-ethylzinc sulfate which comprises reacting diethyl sulfate with finely divided zinc in the presence of and in contact with ethylzinc iodide at a temperature between about 115 to 160° C.
5. A process for the manufacture of ethylzinc ethylsulfate which comprises reacting diethyl sulfate with finely divided zinc in the presence of and in contact with ethylzinc iodide at a temperature between about 65° to 105° C.
6. A process for the manufacture of ethylzinc p-toluene-sulfonate which comprises reacting ethyl p-toluene-sulfonate with finely divided zinc in the presence of and in contact with ethylzinc iodide at a temperature between about 75 to 125° C.
7. Compounds of claim 1 wherein the hydrocarbon groups are alkyl groups containing up to and including about 6 carbon atoms.
8. The process of claim 3 wherein the hydrocarbon groups of said dihydrocarbon esters of sulfuric acid, said hydrocarbon ester of a hydrocarbon sulfonic acid, said hydrocarbon zinc halides, and said hydrocarbon halides are alkyl groups containing up to and including about 6 carbon atoms.

References Cited in the file of this patent

FOREIGN PATENTS

| | | |
|---|---|---|
| 584,196 | Great Britain | Jan. 9, 1947 |
| 603,616 | Great Britain | June 18, 1948 |